United States Patent [19]
Debart

[11] 3,841,755
[45] Oct. 15, 1974

[54] DOPPLER EFFECT TELEMETER INCLUDING FREQUENCY SHIFTING

[75] Inventor: Hubert Debart, Meudon, France

[73] Assignee: Compagnie Generale D'Electricite, Paris, France

[22] Filed: Dec. 4, 1972

[21] Appl. No.: 312,007

[30] Foreign Application Priority Data
Dec. 3, 1971   France .................... 71.043503

[52] U.S. Cl. ........................ 356/28, 356/5, 343/8, 343/17.2 R
[51] Int. Cl. ........................................... G01p 3/36
[58] Field of Search .............. 356/4, 5, 28; 343/8, 9, 343/17.2 R

[56] References Cited
UNITED STATES PATENTS
3,055,258   9/1962   Hurvitz ...................... 343/17.2 R
3,149,326   9/1964   Naidich ............................ 343/9
3,362,024   1/1968   Badewitz ........................... 343/9
3,546,695  12/1970   Freedman ..................... 343/17.2 R Primary Examiner—Richard A. Farley
Assistant Examiner—S. C. Buczinski
Attorney, Agent, or Firm—Sughrue, Rothwell, Mion, Zinn & Macpeak

[57] ABSTRACT

A doppler effect and modulated frequency telemeter in which the frequency of the signal sent toward a target is modulated with symmetrical saw-tooth waves. The time interval between two successive passes through a fixed reference frequency of the shifted frequency of the signal sent back by the target is used to develop an interval signal which is proportional to the relative radial speed of the target.

5 Claims, 2 Drawing Figures

DOPPLER EFFECT TELEMETER INCLUDING FREQUENCY SHIFTING

BACKGROUND OF THE INVENTION

The present invention concerns Doppler effect telemetry, that is, the measuring of the relative radial speed of a target in relation to a telemeter, by sending, towards that target, a radiation which is reflected by that target toward that telemeter and by measuring the frequency shift which results therefrom between the radiation sent out and the radiation received.

It is a known practice, in telemeters of that type, to modulate the frequency of the radiation sent out by making it increase or decrease according to a linear ramp as a function of time. These telemeters have the disadvantage that the measuring of the frequencies on the return requires relatively complex apparatus.

One aim of the present invention is to enable the measuring of the relative radial speed of a target by Doppler effect on a signal whose frequency varies linearly as a function of time, by means of a particularly simple apparatus.

SUMMARY OF THE INVENTION

The Doppler effect and modulated frequency telemeter according to the invention comprises a scanning source capable of causing an alternate scanning signal having an adjustable frequency to be propagated towards a target capable of reflecting that scanning signal, to send back, towards the telemeter, a response signal resulting from that scanning signal by frequency shift. The scanning signal may be constituted by the radiation sent out by the source, for example by a radiation of a mechanical type, ultrasonic waves, for example, or by an electromagnetic radiation such as ultra high frequency waves or light. In the latter case, the monochromatic light requirement leads to the use of a laser generator.

The scanning signal may also be constituted by a signal modulating a carrier radiation sent towards the target. It is then propagated towards that target at the same time as the radiation which it modulates. As for the targets, it is usual for them to reflect the scanning signal in all directions, more particularly towards the telemeter.

A modulation generator controls the aforementioned source by a modulation signal, in order to create a variation in the frequency of the scanning signal according to a predetermined variation law as a function of time. It is more particularly a known practice to give that predetermined variation law the form of linear ramps.

The telemeter according to the invention comprises, moreover, a receiving assembly which receives the radiation reflected by the target and which is sensitive to the frequency shift between the response signal carried by that reflected radiation and the data scanning signal. That receiving assembly supplies a speed indication signal proportional to the frequency shift. The elements which have just been described are known.

The telemeter according to the invention is characterized in that the receiving assembly comprises a frequency comparator supplying a pass signal each time the frequency of the response signal is equal to a predetermined reference frequency.

The frequency shift affecting the response signal in relation to the scanning signal then results in a modification of the instants at which the pass signals are supplied. It is by examining these instants that the relative radial speed of the target is determined according to the invention.

The predetermined variation law affecting the frequency of the scanning signal is a periodic and alternate succession of ramps of two different types, that is, of ramps having two different slopes making the frequency of the scanning signal vary between a low frequency and a high frequency.

The slopes of both types of ramps may have the same sign, that is, the two ramps may make the frequency of the scanning signal increase or decrease at different speeds. These two slopes may also have opposite signs, that is, the ramps of one type may be increasing and the ramps of the other type decreasing.

It may be an advantage, more particularly, to use linear ramps which are alternately increasing and decreasing in a same duration between the high and low frequencies, that is, a symmetrical saw-tooth modulation.

As for the reference frequency, it is chosen such that the interval of time between two successive passes of the frequency of the scanning signal through that reference frequency be equal to the half-cycle of the succession of ramps.

It is quite evident, since the succession of ramps is periodical, that the time interval between the passes of two successive ramps of a same type through the reference frequency is constant and equal to the cycle of the succession, whatever the value the reference frequency may be. Nevertheless, between these two ramps of a same type, there is a ramp of the other type. It passes through the reference frequency at an intermediate pass instant whose position, in the above constant interval, depends on the value of the reference frequency. That value is selected to place that intermediate pass instant, corresponding to the other type of ramp, in the middle of that constant interval. The intervals between two successive passes of the scanning signal frequency through the reference frequency are then all equal to the half-cycle of the succession. In the case of linear ramps both reaching the high and low frequencies, the reference is evidently the average frequency between these high and low frequencies.

A time comparator receives the aforementioned pass signals and supplies at least one interval signal representing the value of a pass interval, that is, of an interval of time between two successive pass signals. That time interval depends on the relative radial speed of the target, for the DOPPLER effect resulting from that speed causes a shift in frequency of the response signal, but not of the reference frequency.

That is why a speed indicator receives the aforementioned interval signal and supplies a speed indication depending on the value of that interval signal. Two successive pass intervals are affected in a different way by the DOPPLER effect: the one is prolonged and the other is shortened. Accuracy in the measuring of speed may therefore be improved by measuring, not the duration of one of these pass intervals, but the difference between the duration of these two intervals.

That is why, according to the present invention, the aforementioned interval comparator supplies, to great advantage, at least two interval signals corresponding, the one, to a long interval, that is, to pass interval longer than the half-cycle of the succession of ramps, and the other, to a short interval, that is, to a pass interval shorter than the half-cycle of the succession of ramps. The speed indicator then supplies a speed indication proportional to the difference between that long interval and that short interval. Obviously, accuracy is better if that measuring of the difference is effected over several long intervals and several short intervals.

By means of FIGS. 1 and 2 herewith, an example of the implementing of the present invention will be described by way of an illustration having no limiting character.

DETAILED DESCRIPTION OF THE PREFERRED EMBODIMENT

Figure 1:
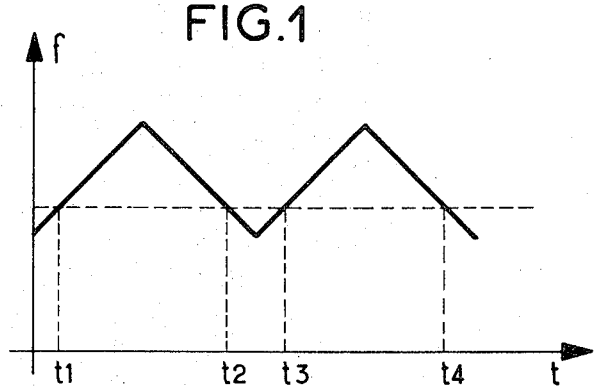
FIG. 1 shows a diagram of the variation, as a function of the time set forth in the abscissa, of the frequency of the aforementioned response signal. That diagram is shown in continuous lines.

FIG. 1 shows that the frequency of the response signal varies in symmetrical saw-tooth waves, that is, the increasing ramps and the aforementioned decreasing ramps have the same slope, in absolute value. The reference frequency is shown by a discontinuous horizontal line. That reference frequency is equal to the average value of the frequency of the scanning signal. The variation in the frequency of the scanning signal has the same form as that of the response signal shown in the figure. But that response signal has its frequency shifted upwards by DOPPLER effect, this meaning that the target is coming nearer to the telemeter. The amplitude of that frequency shift is a measurement of the speed at which the target is approaching.

In FIG. 1, vertical discontinuous lines show the instants $t_1, t_2, t_3, t_4$ at which the frequency of the response signal passes through the reference frequency. It will be seen that certain pass intervals such as $t_1, t_2$ and $t_3, t_4$ are longer than the half-cycle of recurrence of the saw-tooth. These are the aforementioned long intervals.

As for the interval $t_2-t_3$ which is shorter than the half-cycle, it is one of the aforementioned short intervals. It is clear that the long intervals such as $t_1, t_2$ or $t_3, t_4$ are all the longer as the short intervals such as $t_2, t_3$ are all the shorter than the frequency shift by DOPPLER effect, that is, the elevation of the curve consisting of continuous lines representing the frequency of the response signal, is greater. The measuring of the duration of a long interval or of a short interval or of the difference between a long interval and a short interval, or between several long intervals and several short intervals, therefore constitutes a measuring of the relative radial speed of the target.

Figure 2:
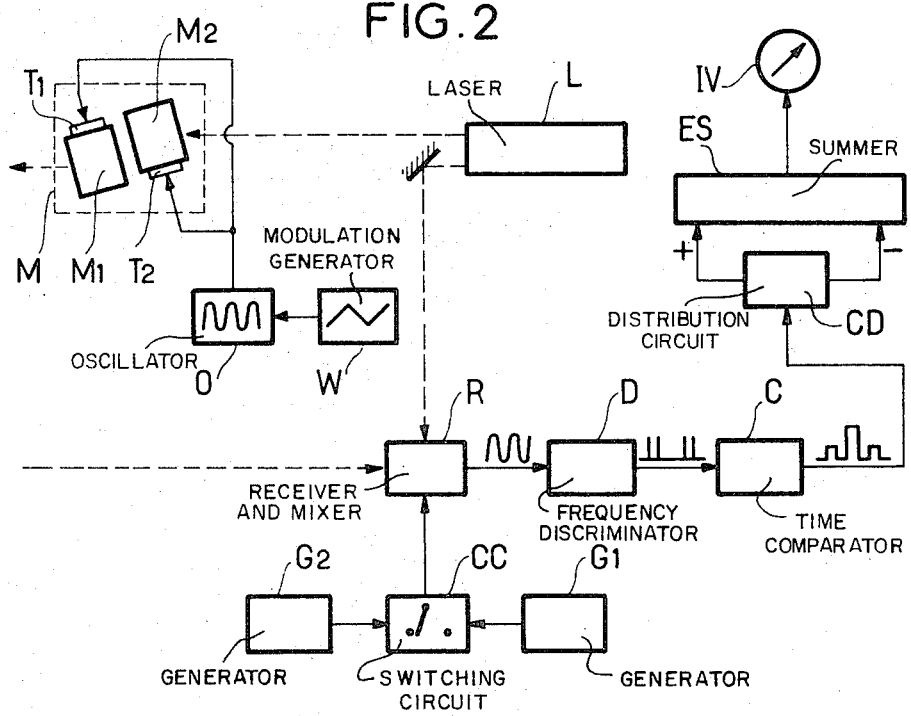
FIG. 2 shows a block diagram of the telemeter according to the invention.

The telemeter shown in FIG. 2 enables that measuring.

FIG. 2 shows a laser emitter L whose beam crosses a modulator having a frequency M which implements the Bragg effect. That modulator is composed of two blocks M1 and M2, in which ultrasonic waves produced by transducers T1 and T2 are propagated. The operation of the BRAGG effect modulators is known to the man in the art. The interaction between the ultrasonic waves and the light within the blocks M1 and M2 causes, within each of these latter, frequency shifts and a deviation in the direction of the light beam. These two blocks are arranged so that the angular shifts cancel out whereas the frequency shifts are added together.

In FIG. 2, the light beams are represented by discontinuous lines, whereas the electrical connections are represented by continuous lines.

The transducers T1 and T2 are supplied with alternating current having an ultrasonic frequency by an oscillator O. The assembly comprising the laser L, the modulator M and the oscillator O constitutes the aforementioned scanning source.

The frequency of the oscillator O is controlled by a modulation generator W. The latter applies to the oscillator O a modulation signal constituted by an alternate succession of increasing and decreasing ramps, the modulation signal possibly being shown by the same diagram as the frequency of the response signal in FIG. 1. The response signal supplied by the target is received by a receiver and mixer unit R. That receiver receives, moreover, a reference light beam generated by the laser L. It supplies an alternate electric signal whose frequency is equal to the difference between the frequency of the response signal received, coming from the target and the aforementioned fixed reference frequency. That reference frequency is close to that of the reference beam supplied by the laser L to the receiver R. That receiver comprises frequency transposing means for producing an output signal whose frequency is truly that which has previously been mentioned to be obtained. The output signal of the receiver and mixer unit R is applied to a frequency discriminator D which supplies a pass signal each time the frequency of the signal it receives passes through zero.

These pass signals are received by a time comparator C which supplies interval signals, for example of the analog type, representing the duration of the pass intervals between two successive pass signals. These interval signals have, alternately, a high value and a low value, corresponding to the long intervals and to the short intervals, for example. They are received by a distribution circuit CD which transmits them alternately on one or the other of its two outputs. These two outputs are each connected to one of the two inputs of an algebraic summing assembly ES, one of these inputs being affected by a positive sign and the other by a negative sign, that is, the circuit ES counts positively every other signal of the interval sign, and counts negatively the others. That assembly ES is arranged so as to take into consideration only a certain number of interval signals it receives, these signals being still those which have been received last. This is the equivalent of saying that this summing assembly calculates the average over a certain duration of the value of the high interval signals, from which is subtracted that of the low interval signals. The average difference calculated by the summing assembly ES appears on a speed indicator IV.

It should nevertheless be observed that this difference shows only the absolute value of the speed of the target, that is, it is not known whether the target is approaching or moving away. Various means enable that ambiguity to be solved: for example, it is possible to use, instead of the aforementioned reference frequency, an auxiliary frequency slightly shifted in relation to that reference frequency. For that purpose, the modulation generator W or the transposition means comprised in the receiver and mixer unit R, is operated. This is the equivalent, on referring to FIG. 1, of slightly shifting the horizontal line consisting of discontinuous lines which defines the pass intervals.

The result of this is a modification in the reading on the indicator IV. The direction of that modification indicates whether the target is approaching or moving away.

FIG. 2 shows, by way of example, two generators G1 and G2 generating alternate signals whose frequency has been suitably selected, enabling either one or the other of two different frequencies brought into play in the aforementioned frequency transposition to be supplied to the receiver and mixer unit R through a switching circuit CC. It is by acting on the switching circuit CC that a shift in the reference frequency is obtained. These two different frequencies correspond, the one to the reference frequency, the other to the auxiliary frequency by a same transposition.

What is claimed is:

1. A DOPPLER effect and modulated frequency telemeter comprising:
   a. scanning means for causing an alternate scanning signal having an adjustable frequency to be propagated towards a target capable of reflecting that scanning signal, by sending back, towards the telemeter, a frequency shifted response signal resulting from reflection of that scanning signal;
   b. modulation generator means for controlling said scanning means by a modulation signal so as to create a variation in the frequency of the said scanning signal according to a predetermined variation law as a function of time;
   c. receiving means, sensitive to the frequency shift between said response signal and said scanning signal, for supplying a speed indication signal proportional to that shift;
   d. wherein said receiving means comprises a frequency comparator supplying a pass signal each time the frequency of the said response signal is equal to a predetermined reference frequency, the said predetermined frequency variation law being a periodic and alternate succession of ramps of two different types, that is, of ramps of two different slopes making the frequency of the said scanning signal vary between a low frequency and a high frequency, said reference frequency being chosen such that the time interval between two successive passes of the frequency of said scanning signal through that reference frequency be equal to the half-cycle of that succession of ramps;
   e. time comparator means, receiving said pass signals for supplying at least one interval signal representing the value of a pass interval, that is, of a time interval between two successive pass signals; and
   f. speed indicator means for receiving said interval signal and supplying a speed indication dependent on the value of that interval signal.

2. Telemeter according to claim 1, wherein said scanning means comprises a laser transmitter whose light beam crosses through a BRAGG effect frequency modulator provided with a piezo-electric transducer supplied by an electronic oscillator having an adjustable frequency controlled by the said modulation generator.

3. Telemeter according to claim 1, wherein said time comparator means supplies at least two interval signals corresponding, the one to the long interval, that is, to a said pass interval longer than the said half-cycle, and the other to a short interval, that is, to a said pass interval shorter than the said half-cycle, the said speed indicator means supplying a speed indication proportional to the difference between the said long interval and the said short interval.

4. Telemeter according to claim 3, wherein the ramps of the said two types are linear ramps alternately increasing and decreasing in a same duration between the said high and low frequencies, the said reference frequency being the average frequency between these high and low frequencies.

5. Telemeter according to claim 1, further including means for replacing said reference frequency by a predetermined auxiliary frequency different from that reference frequency.

* * * * *